(12) United States Patent
Takasaki et al.

(10) Patent No.: US 7,083,670 B2
(45) Date of Patent: *Aug. 1, 2006

(54) AQUEOUS INK AND INKJET RECORDING INK

(75) Inventors: Masaru Takasaki, Kanagawa (JP); Toshiki Fujiwara, Kanagawa (JP); Tomohiro Chino, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/940,967

(22) Filed: Sep. 15, 2004

(65) Prior Publication Data

US 2005/0061201 A1 Mar. 24, 2005

(30) Foreign Application Priority Data

Sep. 24, 2003 (JP) ............................. 2003-331807
Aug. 27, 2004 (JP) ............................. 2004-248863

(51) Int. Cl.
*C09D 11/00* (2006.01)

(52) U.S. Cl. ............................. 106/31.52; 106/31.48; 106/31.5

(58) Field of Classification Search ............. 106/31.52, 106/31.48, 31.5; 534/761
See application file for complete search history.

(56) References Cited

U.S. PATENT DOCUMENTS

| 4,124,581 | A | * | 11/1978 | Vor der Bruck et al. .... 534/761 |
| 4,837,269 | A | * | 6/1989 | Etzbach et al. ............. 534/761 |
| 4,908,435 | A | * | 3/1990 | Gregory ..................... 534/761 |
| 2004/0187232 | A1 | * | 9/2004 | Chino et al. ................. 8/639 |
| 2005/0074684 | A1 | * | 4/2005 | Yabuki et al. .......... 430/108.23 |
| 2005/0139121 | A1 | * | 6/2005 | Fujiwara et al. ............ 106/31.5 |
| 2005/0139123 | A1 | * | 6/2005 | Fujiwara ................... 106/31.48 |
| 2005/0150420 | A1 | * | 7/2005 | Takasaka et al. ........... 106/31.5 |

FOREIGN PATENT DOCUMENTS

| EP | 0 492 911 A1 | 7/1992 |
| EP | 1 437 387 A1 | 7/2004 |
| EP | 1 437 388 A1 | 7/2004 |
| JP | 52-76331 | 6/1977 |
| JP | 06088034 | 3/1994 |

OTHER PUBLICATIONS

*European Patent Office Search Report, Dec. 2004, Copy Attached.

* cited by examiner

Primary Examiner—Helene Klemanski
(74) Attorney, Agent, or Firm—Buchanan Ingersoll PC

(57) ABSTRACT

An aqueous ink comprising at least one dye having at least one ionic hydrophilic group within a molecule thereof and represented by the following formula (1):

Formula (1):

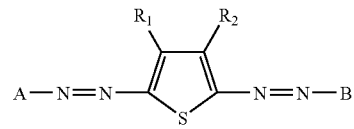

wherein A and B each independently represents a substituted or unsubstituted monovalent aromatic group or a substituted or unsubstituted monovalent heterocyclic group, $R_1$ represents a substituted or unsubstituted aromatic group excluding an unsubstituted phenyl group or a substituted or unsubstituted heterocyclic group, and $R_2$ represents a substituent.

8 Claims, No Drawings

AQUEOUS INK AND INKJET RECORDING INK

FIELD OF THE INVENTION

The present invention relates to a novel aqueous ink, its use as an inkjet recording ink, and an inkjet recording method.

BACKGROUND OF THE INVENTION

The inkjet recording method is abruptly overspread and still making a progress, because the material cost is low, high-speed recording can be performed, noises are less generated at the recording and color recording is facilitated.

The inkjet recording method includes a continuous system of continuously jetting out a liquid droplet and an on-demand system of jetting out a liquid droplet according to image information signals, and the ejection system therefor includes a system of ejecting a liquid droplet by applying a pressure from a piezoelectric element, a system of ejecting a liquid droplet by generating a bubble in an ink under heat, a system using an ultrasonic wave, and a system of ejecting a liquid droplet by suction using an electrostatic force. As for the inkjet recording ink, an aqueous ink, an oil-based ink or a solid (fusion-type) ink is used.

The coloring agent used in such an inkjet recording ink is required to exhibit good solubility or dispersibility in a solvent, enable high-density recording, provide good color hue, be fast to light, heat and active gases in the environment (for example, oxidative gas (e.g., NOx, ozone) and SOx) and highly resistant against water and chemicals, ensure good fixing property and less blurring on an image-receiving material, give an ink having excellent storability, have high purity and no toxicity and be available at a low cost. However, it is very difficult to find out a coloring agent satisfying these requirements in a high level.

JP-A-52-76331 (the term "JP-A" as used herein means an "unexamined published Japanese patent application") describes a water-soluble disazo dye having a heterocyclic ring, but when an ink is prepared by using this water-soluble disazo dye, the ink is insufficient in the storage stability. An ink having excellent storage stability and fastness to oxidative gas such as ozone is keenly demanded.

SUMMARY OF THE INVENTION

The present invention has been made to solve the above-described problem and achieve the following object.

An object of the present invention is to provide an aqueous ink for inkjet recording and an inkjet recording method, where the storage stability as an ink is excellent and a colored image or colored material having good color hue and excellent fastness to light and active gases in the environment, particularly, ozone gas is obtained.

The present inventors have made extensive studies on water-soluble disazo dye derivatives containing a heterocyclic compound with an aim to obtain a dye having excellent storage stability as an ink and having good color hue and high fastness to light and ozone, as a result, it has been found that the above-described problem can be overcome by a dye having a thiophene ring and at the same time, having an aromatic group (excluding an unsubstituted phenyl ring group) or a heterocyclic group at the 4-position of the thiophene ring.

That is, according to the present invention, an aqueous ink, an inkjet recording ink and an ink-jet recording method having the following constitutions are provided and thereby, the above-described object of the present invention can be attained.

1. An aqueous ink comprising at least one dye having at least one ionic hydrophilic group within the molecule and represented by the following formula (1):

Formula (1):

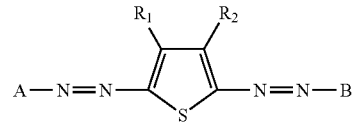

wherein

A and B each independently represents a substituted or unsubstituted monovalent aromatic group or a substituted or unsubstituted monovalent heterocyclic group, $R_1$ represents a substituted or unsubstituted aromatic group (excluding an unsubstituted phenyl group) or a substituted or unsubstituted heterocyclic group, and $R_2$ represents a substituent.

2. The aqueous ink as described in 1 above, wherein in formula (1), B is a substituted or unsubstituted heterocyclic group.

3. The aqueous ink as described in 1 or 2 above, wherein the azo dye represented by formula (1) is a dye represented by the following formula (2):

Formula (2):

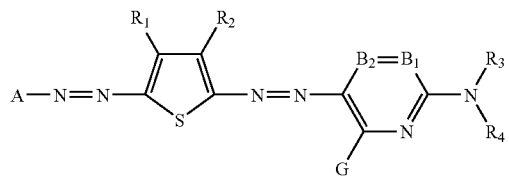

wherein $B_1$ and $B_2$ each represents $=CR_5-$ or $-CR_6=$ or either one of $B_1$ and $B_2$ represents a nitrogen atom and the other represents $=CR_5-$ or $-CR_6=$;

G, $R_5$ and $R_6$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted;

$R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may be further substituted, provided that $R_3$ and $R_4$ are not a hydrogen atom at the same time; and $R_3$ and $R_5$, or $R_3$ and $R_4$ may combine to form a 5- or 6-membered ring.

4. The aqueous ink as described in 3 above, wherein the azo dye represented by formula (2) is a dye represented by the following formula (3):

Formula (3):

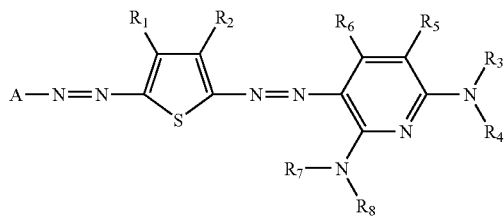

wherein $R_7$ and $R_8$ have the same meanings as $R_3$ and $R_4$ in formula (2).

5. The aqueous ink as described in any one of 1 to 4 above, wherein in formulae (1) to (3), $R_1$ is a substituted phenyl group, a substituted or unsubstituted naphthyl group or a substituted or unsubstituted heterocyclic group.

6. An inkjet recording ink comprising using the aqueous ink described in any one of 1 to 5.

7. An inkjet recording method comprising forming an image on an image-receiving material by using the ink-jet recording ink claimed in 6 above, the image-receiving material comprising a support having thereon an ink-receiving layer containing an white inorganic pigment particle.

The aqueous ink of the present invention is excellent in the ink storage stability and can give a colored image or colored material excellent in the color hue and fastness. In particular, the inkjet recording ink and the ink-jet recording method, using the aqueous ink of the present invention, can be favored by high ink stability and can form an image having good color hue and high fastness to light and active gases in the environment, particularly, ozone gas.

DETAILED DESCRIPTION OF THE INVENTION

The present invention is described in detail below. The azo dyes represented by formula (1) and, as its lower concepts, formulae (2) and (3) are described in detail. First, the groups and substituents in these formulae are described.

The halogen atom includes a fluorine atom, a chlorine atom and a bromine atom.

In the present invention, the aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and in the substituted aralkyl group is preferably phenyl or naphthyl, more preferably phenyl. Examples of the aliphatic group include methyl, ethyl, butyl, isopropyl, tert-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

The monovalent aromatic group means an aryl group and a substituted aryl group. The aryl group is preferably phenyl or naphthyl. The number of carbon atoms in the monovalent aromatic group is preferably from 6 to 20, more preferably from 6 to 16. Examples of the monovalent aromatic group include phenyl, p-tolyl, p-methoxyphenyl, o-chlorophenyl and m-(3-sulfopropylamino)phenyl. The divalent aromatic group is a divalent form of these monovalent aromatic groups and examples thereof include phenylene, p-tolylene, p-methoxyphenylene, o-chlorophenylene, m-(3-sulfopropylamino)phenylene and naphthylene.

The heterocyclic group includes a heterocyclic group having a substituent and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an ionic hydrophilic group. Examples of the alkylamino group include a methylamino group and a diethylamino group. The arylamino group includes an arylamino group having a substituent, an unsubstituted arylamino group and an anilino group. The arylamino group is preferably an arylamino group having from 6 to 20 carbon atoms. Examples of the substituent include a halogen atom and an ionic hydrophilic group. Examples of the arylamino group include a phenylamino group and a 2-chlorophenylamino group. The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-dichlorobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkyl- or aryl-sulfonylamino group includes an alkyl- or aryl-sulfonylamino group having a substituent and an unsubstituted alkyl- or aryl-sulfonylamino group. The sulfonylamino group is preferably a sulfonylamino group having from 1 to 20 carbon atoms. Examples of the substituent include an ionic hydrophilic group. Examples of these sulfonylamino groups include a methylsufonylamino group, an N-phenyl-methylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkyl-, aryl- or heterocyclic-thio group include an alkyl-, aryl- or heterocyclic-thio group having a substituent and an unsubstituted alkyl-, aryl- or heterocyclic-thio group. The alkyl-, aryl- or heterocyclic-thio group is preferably an alkyl-, aryl- or heterocyclic-thio group having from 1 to 20 carbon atoms. Examples of the substituent include an ionic hydrophilic group. Examples of the alkyl-, aryl- or heterocyclic-thio group include a methylthio group, a phenylthio group and a 2-pyridylthio group.

The alkyl- or aryl-sulfonyl group includes an alkyl- or aryl-sulfonyl group having a substituent and an unsubstituted alkyl- or aryl-sulfonyl group. Examples of the alkyl- or aryl-sulfonyl group include a methylsulfonyl group and a phenylsulfonyl group.

The alkyl- or aryl-sulfinyl group includes an alkyl- or aryl-sulfinyl group having a substituent and an unsubstituted alkyl- or aryl-sulfinyl group. Examples of the alkyl- or aryl-sulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Formulae (1), (2) and (3) are described below. In the following, those described above for each group or substituent also apply.

In formula (1), $R_1$ represents an aromatic group which may be substituted (excluding an unsubstituted phenyl group) or a heterocyclic group which may be substituted. $R_1$ is preferably a substituted phenyl group, a substituted or unsubstituted naphthyl group, or a substituted or unsubstituted heterocyclic group (e.g., pyrrole ring, thiophene ring, imidazole ring, thiazole ring, benzothiazole ring, pyridine ring, pyridazine ring), more preferably a substituted phenyl group (particularly, a phenyl group with the para-position being substituted), a substituted or unsubstituted β-naphthyl group, a pyridine ring or a thiazole ring. Examples of the substituent include the substituents described above.

In formula (1), $R_2$ represents a substituent, preferably an electron-withdrawing group. The electron-withdrawing group is a substituent having an electron-withdrawing property due to the electron effect and when a Hammett's substituent constant σp value as a measure for the electron-withdrawing or electron-donating property of a substituent is used, this is a substituent having a large σp value. Examples thereof include a cyano group, a nitro group, a halogen atom, a sulfone group, a trifluoromethyl group, a carbamoyl group, an alkoxycarbonyl group and an alkyl- or aryl-sulfonyl group. The Hammett's substituent constant σp value is briefly described below. The Hammett's rule is an empirical rule advocated by L. P. Hammett in 1935 so as to quantitatively discuss the effect of a substituent on the reaction or equilibrium of benzene derivatives and its propriety is widely admitted at present. The substituent constant determined by the Hammett's rule includes a σp value and a vm value and these values can be found in a large number of general publications but these are described in detail, for example, in J. A. Dean (compiler), *Lange's Handbook of Chemistry*, 12th ed., McGraw-Hill (1979), and *Kagakuno Ryoiki (Chemistry Region)*, special number, No. 122, pp. 96–103, Nankodo (1979). The electron-withdrawing group of $R_2$ is particularly preferably a cyano group.

In formula (1), A and B each independently represents a monovalent aromatic group (for example, an aryl group) which may be substituted, or a monovalent heterocyclic group which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring. The substituent may be an arylazo group or a heterocyclic azo group.

At least one of A and B is preferably a heterocyclic ring. In particular, B is preferably a heterocyclic ring.

The group represented by A is preferably an aromatic ring, a pyrazole ring, an imidazole ring, an isothiazole ring, a thiadiazole ring or a benzothiazole ring, more preferably an aromatic ring or a pyrazole ring.

The heterocyclic group represented by B is preferably an aromatic nitrogen-containing 6-membered heterocyclic group represented by the following formula (4). When B is an aromatic nitrogen-containing 6-membered heterocyclic group represented by formula (4), formula (1) corresponds to formula (2).

Formula (4):

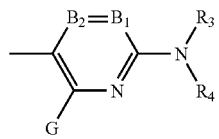

In formulae (2) and (4), $B_1$ and $B_2$ each represents $=CR_5-$ or $-CR_6=$ or either one of $B_1$ and $B_2$ represents a nitrogen atom and the other represents $=CR_5-$ or $-CR_6=$. $B_1$ and $B_2$ each is preferably $=CR_5-$ or $-CR_6=$.

$R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, and each group may further have a substituent. The substituents represented by $R_3$ and $R_4$ each is preferably a hydrogen atom, an aliphatic group, an aromatic group, a heterocyclic group, an acyl group or an alkyl- or aryl-sulfonyl group, more preferably a hydrogen atom, an aromatic group, a heterocyclic group, an acyl group or an alkyl- or arylsulfonyl group, and most preferably a hydrogen atom, an aryl group or a heterocyclic group, and each group may further have a substituent. However, $R_3$ and $R_4$ are not a hydrogen atom at the same time.

G, $R_5$ and $R_6$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group or a sulfo group, and each group may be further substituted.

The substituent represented by G is preferably a hydrogen atom, a halogen atom, an aliphatic group, an aromatic group, a hydroxy group, an alkoxy group, an aryloxy group, an acyloxy group, a heterocyclic oxy group, an amino group (including an anilino group and a heterocyclic amino group), an acylamino group, a ureido group, a sulfamoylamino group, an alkoxycarbonylamino group, an aryloxycarbonylamino group, an alkyl- or aryl-thio group or a heterocyclic thio group, more preferably a hydrogen atom, a halogen atom, an alkyl group, a hydroxy group, an alkoxy group, an aryloxy group, an acyloxy group, an amino group (including an anilino group and a heterocyclic amino group) or an acylamino group, still more preferably a hydrogen atom, an anilino group or an acylamino group, and each group may further have a substituent.

The substituents represented by $R_5$ and $R_6$ each is preferably a hydrogen atom, an alkyl group, an aryl group, a halogen atom, an alkoxycarbonyl group, a carboxyl group, a carbamoyl group, a hydroxy group, an alkoxy group or a cyano group, and each group may further have a substituent. $R_3$ and $R_5$, or $R_3$ and $R_4$ may combine to form a 5- or 6-membered ring.

When the substituents represented by A, $R_1$, $R_2$, $R_3$, $R_4$, $R_5$, $R_6$ and G in formulae (2) and (4) each further has a substituent, examples of the substituent include the substituents described above for G, $R_5$ and $R_6$. Also, an ionic hydrophilic group is preferably further present as a substituent at any one position of A, $R_1$, $R_2$, $R_3$, $R_4$, $R_5$, $R_6$ and G.

Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

The heterocyclic group represented by B is more preferably a pyridine ring and in this case, the azo dye is represented by the following formula (3):

Formula (3):

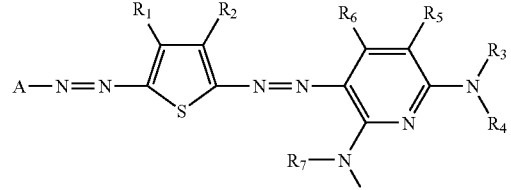

In the azo dye represented by formula (3), the following combination of substituents is particularly preferred. $R_3$ and $R_4$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R_3$ and $R_4$ are not a hydrogen atom at the same time. $R_7$ and $R_8$ have the same meanings as $R_3$ and $R_4$ in formula (3).

In the present invention, the dye is particularly preferably a dye having a structure represented by the following formula (5):

Formula (5):

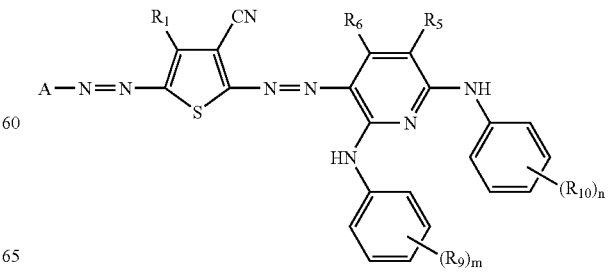

wherein A represents a monovalent aromatic ring, preferably a phenyl group or a naphthyl group, $R_1$ represents an aromatic group (excluding an unsubstituted phenyl ring group) which may be substituted or a heterocyclic group which may be substituted, $R_5$ and $R_6$ each represents a hydrogen atom, an alkyl group, an aryl group, a halogen atom, an alkoxycarbonyl group, a carboxyl group, a carbamoyl group, a hydroxy group, an alkoxy group or a cyano group, $R_9$ and $R_{10}$ each represents an ionic hydrophilic group, preferably a sulfo group or a carboxyl group, and m and n each represents an integer of 1 to 3.

The groups described in regard to formula (5) each may further have a substituent. When these groups each further has a substituent, examples of the substituent include the substituents described in regard to formula (2), the groups described as examples of G, $R_5$ and $R_6$, and an ionic hydrophilic group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are set forth below, but the azo dye for use in the present invention is not limited to these examples. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

TABLE 1

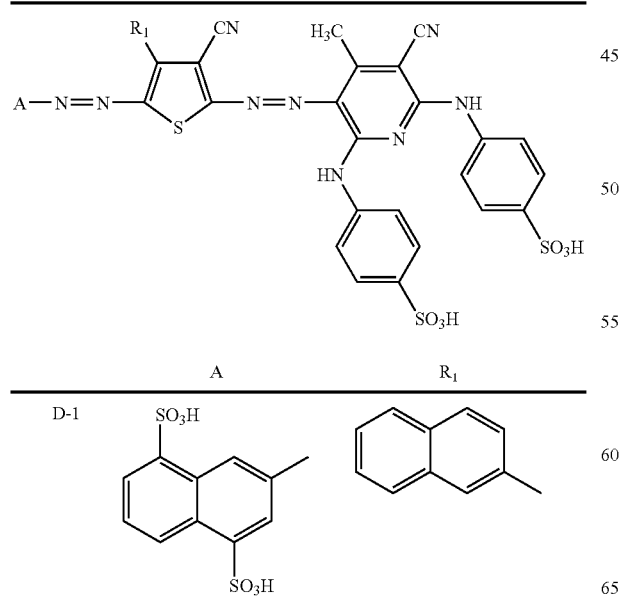

TABLE 1-continued

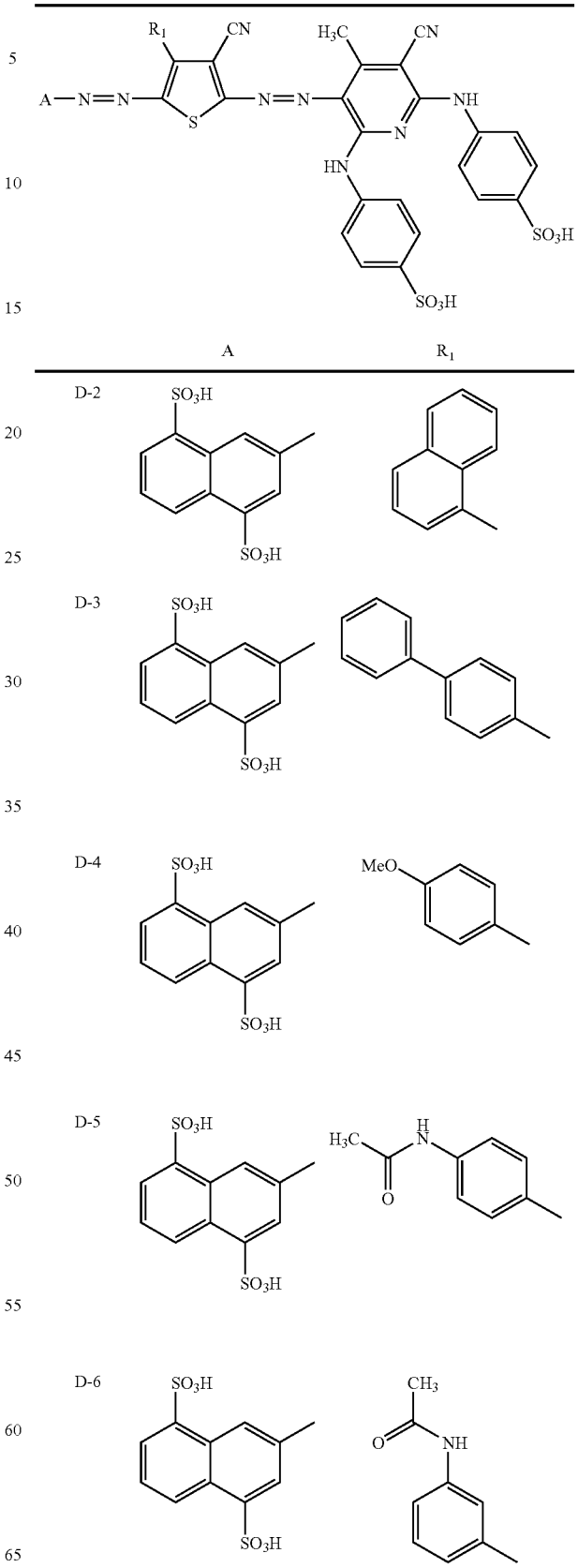

TABLE 1-continued

[Structure: A—N=N—(thiophene with R₁, CN)—N=N—(pyridine with CH₃, CN, NH-phenyl-SO₃H, NH-phenyl-SO₃H)]

| | A | R₁ |
|---|---|---|
| D-7 | 3-methyl-naphthalene-1,5-disulfonic acid (SO₃H at 1,5) | 2-methylphenyl-NHCOCH₃ |
| D-8 | 3-methyl-naphthalene-1,5-disulfonic acid | 2-methylphenyl-CO₂H |

TABLE 2

[Structure: A—N=N—(thiophene with R₁, CN)—N=N—(pyridine with CH₃, CN, NH-phenyl-SO₃H at para of one NH, and other NH-phenyl with SO₃H at meta)]

| | A | R₁ |
|---|---|---|
| D-9 | 7-methylnaphthalene-1,3,5-trisulfonic acid (SO₃H, HO₃S, SO₃H) | 2-methylnaphthyl |

TABLE 2-continued

[Structure: A—N=N—(thiophene with R₁, CN)—N=N—(pyridine variant with CH₃, CN, NH and NH-aryl-SO₃H groups)]

| | A | R₁ |
|---|---|---|
| D-10 | 3-methylnaphthalene-1,5-disulfonic acid | 2-methylthiazole |
| D-11 | 3-methylnaphthalene-1,5-disulfonic acid | 4-methylphenyl-NHSO₂CH₃ |
| D-12 | 3-methylnaphthalene-1,5-disulfonic acid | 3-methylpyridine |
| D-13 | 7-methylnaphthalene-1,3,5-trisulfonic acid | 4-methylphenyl-NHCOCH₃ |
| D-14 | 3-methylnaphthalene-1,5-disulfonic acid | 4-methylphenyl-NHCONHCH₃ |
| D-15 | 3-methylnaphthalene-1,5-disulfonic acid | 1,4-dimethylphenyl |

TABLE 2-continued
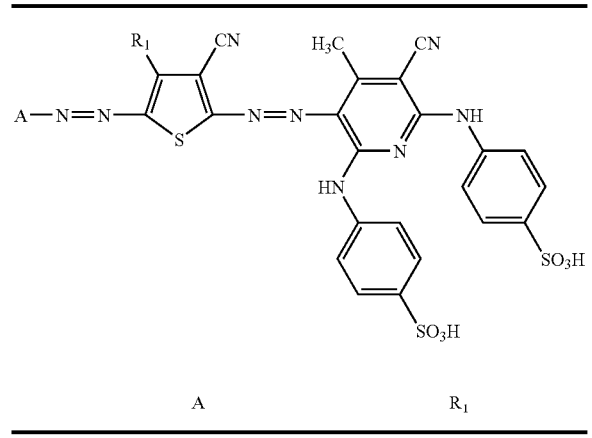
| | A | R₁ |
|---|---|---|
| D-16 | 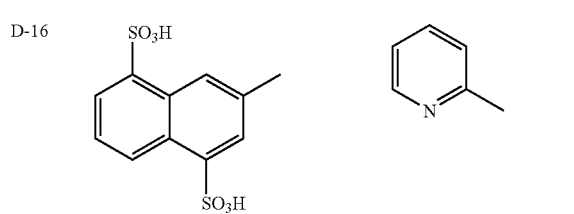 | |
TABLE 3
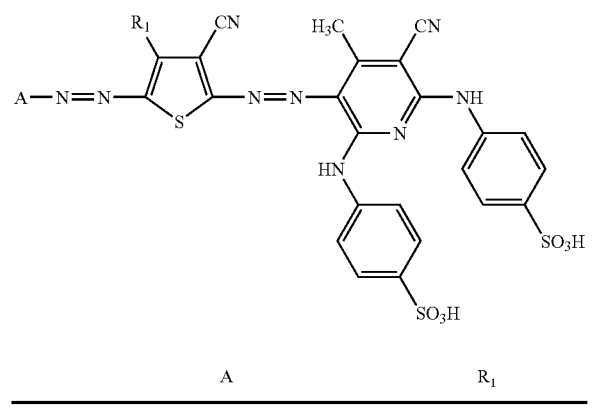
| | A | R₁ |
|---|---|---|
| D-17 | 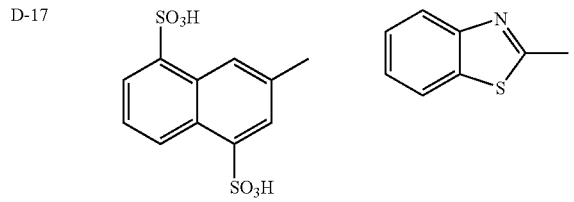 | |
| D-18 | 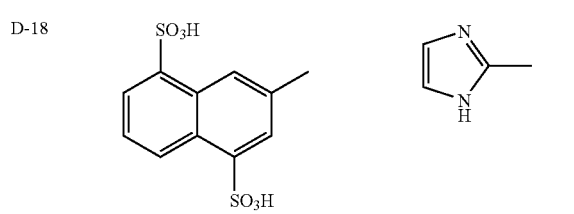 | |
TABLE 3-continued
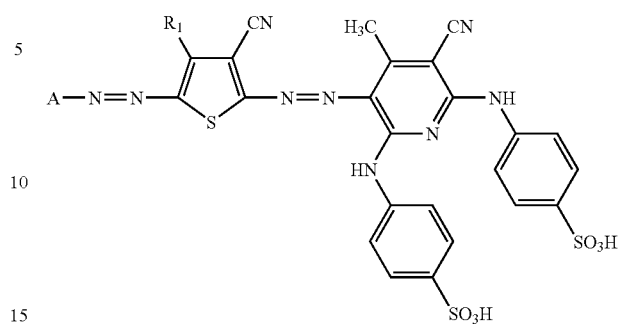
| | A | R₁ |
|---|---|---|
| D-19 | | |
| D-20 | 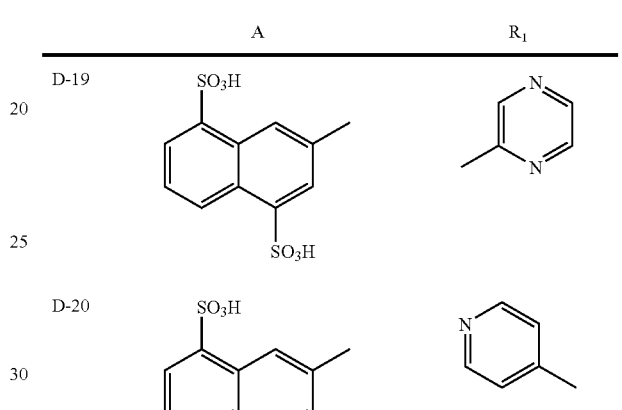 | |
| D-21 | | |
| D-22 | 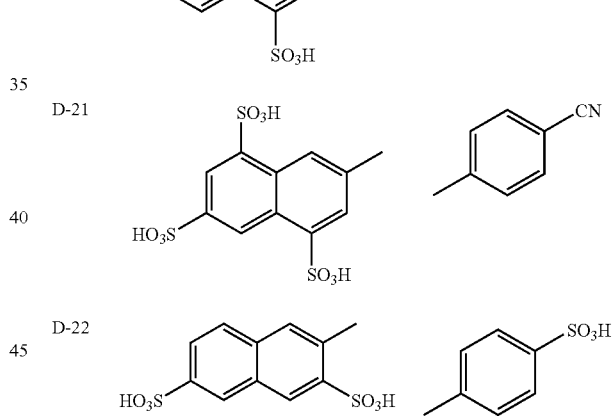 | |
| D-23 | 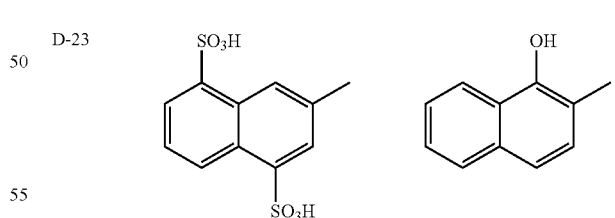 | |
| D-24 | 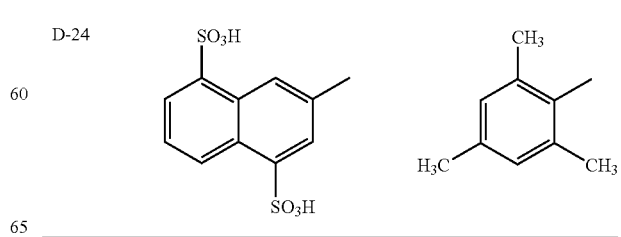 | |

TABLE 4
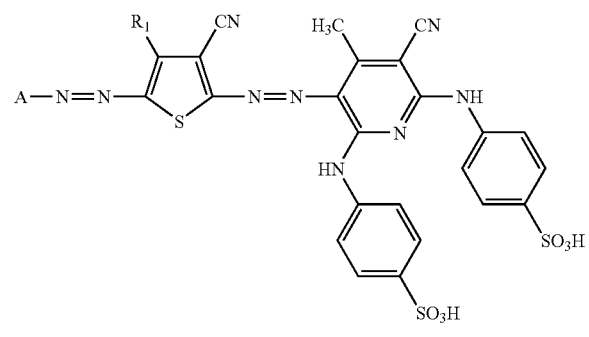
| | A | R₁ |
|---|---|---|
| D-25 | 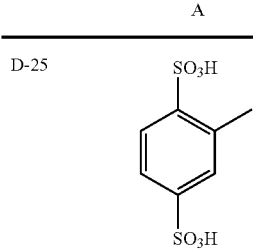 | 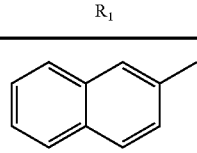 |
| D-26 | 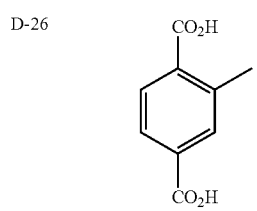 | 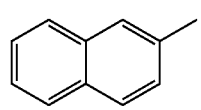 |
| D-27 | 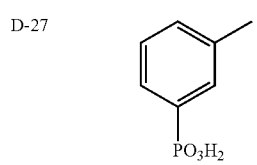 | 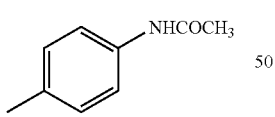 |
| D-28 | 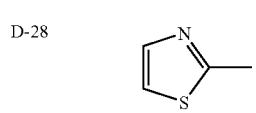 | 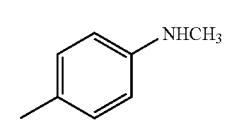 |
TABLE 4-continued
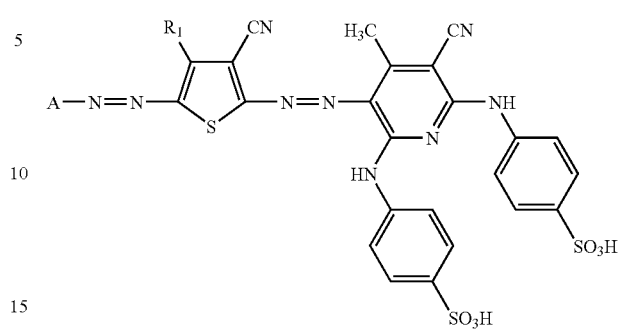
| | A | R₁ |
|---|---|---|
| D-29 | 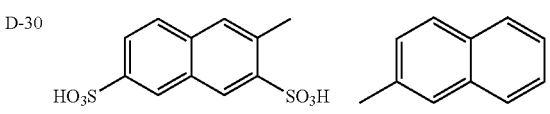 | |
| D-30 | 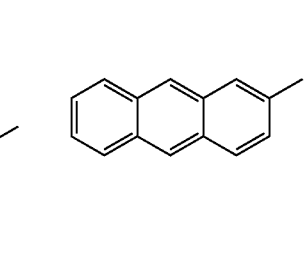 | |
| D-31 | | |
| D-32 | 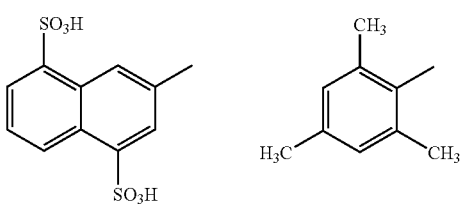 | |

TABLE 5

| | A | R₁ | R₂ |
|---|---|---|---|
| D-33 | 3,5-disulfonaphthyl (1,5-SO₃H, 1,5-SO₃H on naphthalene) | 2-naphthyl | —SO₂CH₃ |
| D-34 | 3,5-disulfonaphthyl | 1-naphthyl | —CONH₂ |
| D-35 | 3,5-disulfonaphthyl | 4-(NHCOCH₃)phenyl | —CO₂Me |
| D-36 | 2,6-disulfonaphthyl | 4-CH(CH₃)₂-phenyl | —CO₂H |
| D-37 | 4-sulfophenyl | 4-OCH₃-phenyl | —SO₂NHCH₃ |
| D-38 | 2,6-disulfonaphthyl | 3-pyridyl | —CF₃ |
| D-39 | 3,5-disulfonaphthyl | 2-naphthyl | 3,5-bis(CF₃)phenyl |

TABLE 5-continued
| | A | $R_1$ | $R_2$ |
|---|---|---|---|
| D-40 | 2-methyl-1,4-benzenedisulfonic acid (SO₃H, SO₃H) | p-tolyl (CH₃) | —CON(CH₃)₂ |
TABLE 6
(structure D-41)
(structure D-42)
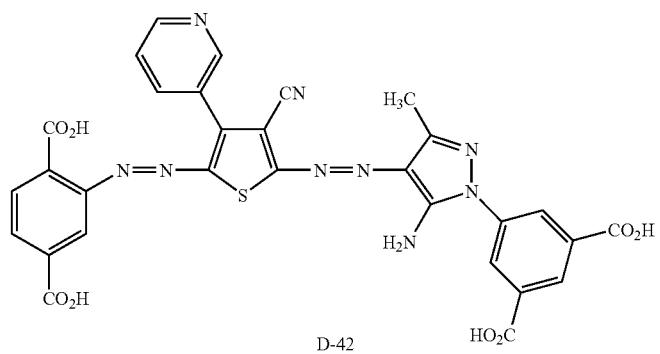

TABLE 6-continued

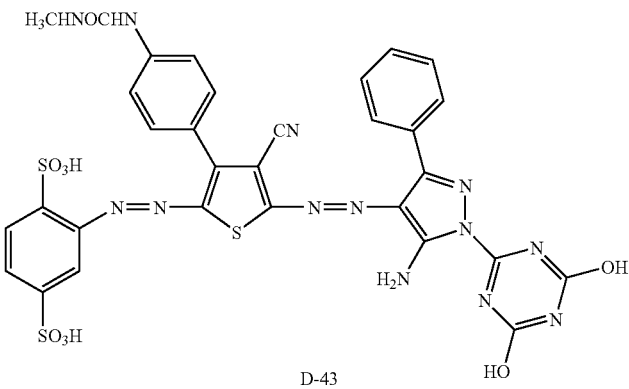

D-43

The dyes represented by formulae (1), (2), (3) and (5) can be synthesized by a coupling reaction of a diazo component and a coupler. Synthesis examples of the dyes represented by formulae (1), (2), (3) and (5) are described below.

<Synthesis Method of Compound D-1>

(1) Synthesis Method of Intermediate (A-2)

To a suspension prepared by adding 40 ml of ethanol to 21.8 g (0.1 mol) of Intermediate (A-1) and 3.27 g (0.1 mol) of S powder, 8.9 mL (0.1 mol) of morpholine was added dropwise at room temperature. The reaction mixture was stirred under heat at 50° C. for 2 hours and the resulting reaction solution was poured into water. The aqueous layer was extracted with ethyl acetate and the organic layer was washed with saturated brine and dried over magnesium sulfate. After filtration through a filter, the filtrate was concentrated and purified by silica gel column to obtain 9.8 g of Intermediate (A-2) (yellow crystal, yield: 39%).

(2) Synthesis Method of Intermediate (A-3)

Water (100 mL) and 14.5 mL of an aqueous 12N hydrochloric acid solution were added to 13.9 g (0.04 mol) of 7-amino-1,5-naphthalenedisulfonic acid and the resulting solution was cooled to 2° C. or less. To this mixed solution, an aqueous solution prepared by dissolving 2.9 g (0.042 mol) of sodium nitrite in 9 mL of water was gradually added dropwise. Thereafter, the reaction solution was stirred at 2° C. or less for 1 hour (diazo solution).

The diazo solution obtained was added dropwise at room temperature to a suspension separately prepared by adding 250 mL of methanol and 62.5 mL of water to 10.0 g (0.04 mol) of Intermediate (A-2). This reaction solution was stirred under heat at 35° C. for 1.5 hours and the crystal precipitated was collected by filtration and washed with isopropyl alcohol to obtain a crude crystal.

To the crude crystal obtained, 500 mL of water was added and an aqueous 1N lithium hydroxide solution was further added dropwise until the pH became 7.0. Thereafter, 90 g of lithium chloride was added at room temperature to the resulting aqueous solution and the crystal precipitated was collected by filtration to obtain 15.3 g of Intermediate (A-3) (orange crystal, yield: 66%).

(3) Synthesis Method of Compound (D-1)

40% Nitrosylsulfuric acid (4.9 mL (0.025 mol)) was added to 270 mL of 85% phosphoric acid and 135 mL of acetic acid and the resulting solution was cooled to −2° C. or less. To this mixed solution, an aqueous solution prepared by dissolving 13 g (0.0225 mol) of Intermediate (A-3) in 75 mL of water was gradually added dropwise. Thereafter, the reaction solution was stirred at −2° C. or less for 30 minutes (diazo solution).

The diazo solution obtained was added dropwise to a solution separately prepared by adding 150 mL of water to 10.5 g (0.021 mol) of Intermediate (A-4) and stirring it under ice cooling and the resulting mixed solution was stirred at room temperature for 1.5 hours. This reaction solution was heated to 60° C. and after adding 90 g of lithium chloride, the crystal precipitated was filtered and washed. To the wet cake obtained, 100 mL of water and 100 mL of methanol were added. After adjusting the pH to 7 with an aqueous 1N sodium hydroxide solution, 1,000 mL of isopropyl alcohol was added and the crystal precipitated was filtered and washed to obtain 9.2 g of Compound (D-1) (M/S=1060, λmax (water)=607 nm). The synthesis route is shown below.

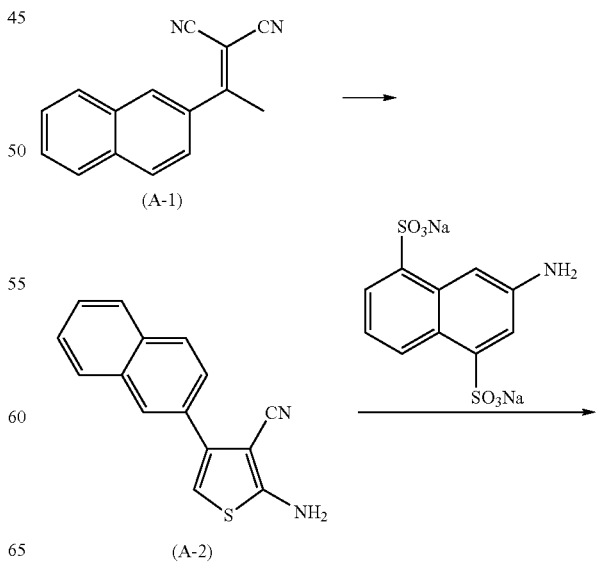

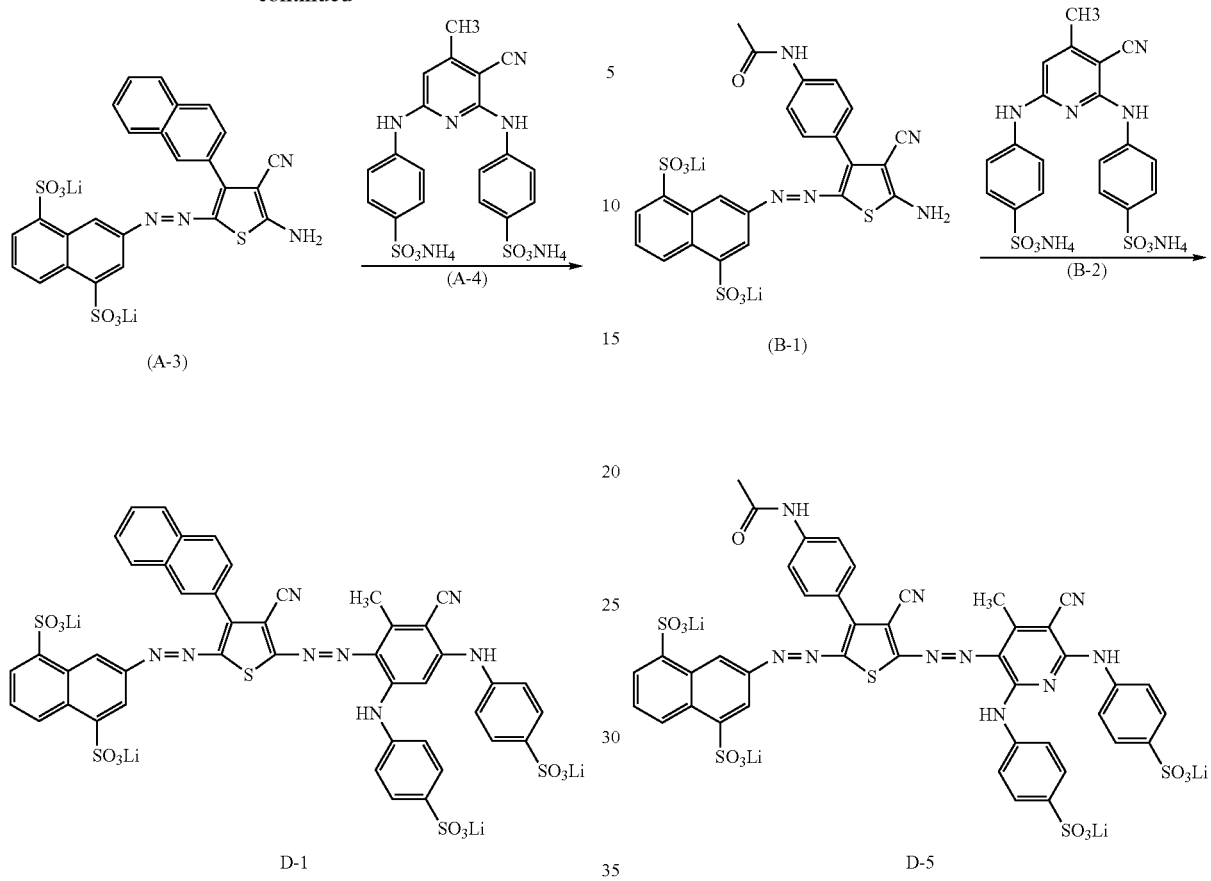

<Synthesis Method of Compound D-5>

Diazo Component (B-1) was synthesized in the same manner as in Synthesis Method of Intermediate (A-3).

40% Nitrosylsulfuric acid (1.31 mL (0.0066 mol)) was added to 72 mL of 85% phosphoric acid and 36 mL of acetic acid and the resulting solution was cooled to −2° C. or less. To this mixed solution, an aqueous solution prepared by suspending 3.5 g (0.006 mol) of Diazo Component (B-1) in 18 mL of water was gradually added dropwise. Thereafter, the reaction solution was stirred at −3° C. or less for 1 hour (diazo solution).

The diazo solution obtained was added dropwise to a solution separately prepared by dissolving 2.81 g (0.0057 mol) of Intermediate (B-2) in 40 mL of water and stirring it under ice cooling and the resulting mixed solution was stirred at room temperature for 3 hours. This reaction solution was heated to 55° C. and after adding 45 g of lithium chloride, the crystal precipitated was filtered and washed. To the wet cake obtained, 20 mL of water and 40 mL of methanol were added. After adjusting the pH to 7 with an aqueous 1N lithium hydroxide solution, 120 mL of isopropyl alcohol was added and the crystal precipitated was filtered and washed to obtain 4.76 g of Compound (D-5) (M/S=1067, λmax (water)=604 nm). The synthesis route is shown below.

The inkjet recording ink can be produced by dissolving and/or dispersing the azo dye represented by formula (1) in a lipophilic medium or an aqueous medium. Preferably, an aqueous medium is used. The ink-jet recording ink contains other additives, if desired, within the range of not inhibiting the effect of the present invention. Examples of other additives include known additives such as drying inhibitor (wetting agent), discoloration inhibitor, emulsification stabilizer, penetration accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent.

In the case of a water-soluble ink, these various additives are added directly to the ink solution.

The drying inhibitor is suitably used for the purpose of preventing clogging due to drying of the inkjet ink at the ejection port of a nozzle for use in the ink-jet recording system.

The drying inhibitor is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. In the ink, the drying inhibitor is preferably contained in an amount of 10 to 50 mass %.

The penetration accelerator is suitably used for the purpose of more successfully penetrating the inkjet ink into paper. Examples of the penetration accelerator which can be used include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be usually obtained by adding from 5 to 30 mass % of the penetration accelerator in the ink. The penetration accelerator is preferably used in an amount of causing no blurring of printed letter or no print through.

The ultraviolet absorbent is used for the purpose of enhancing the preservability of image. Examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure No. 24239, and compounds of absorbing ultraviolet light and emitting fluorescent light, so-called fluorescent brightening agents, as represented by stilbene-base compounds and benzoxazole-base compounds.

The discoloration inhibitor is used for the purpose of enhancing the preservability of image. As the discoloration inhibitor, various organic or metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in Research Disclosure, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydroacetate, sodium benzoate, sodium pyridinethione-1-oxide, ethyl p-hydroxybenzoate, 1,2-benzisothiazolin-3-one and salts thereof. In the ink, the fungicide is preferably used in an amount of 0.02 to 1.00 mass %.

As the pH adjusting agent, a neutralizer (e.g., organic base, inorganic alkali) can be used. The pH adjusting agent is used for the purpose of enhancing the storage stability of inkjet ink. The pH adjusting agent is preferably added so that the inkjet ink can be used in summer, that is, can have a pH of 6 to 10, more preferably a pH of 7 to 10.

Examples of the surface tension adjusting agent include nonionic, cationic or anionic surfactants. The surface tension of the inkjet ink of the present invention is preferably from 20 to 60 mN/m, more preferably from 25 to 45 mN/m. Also, the viscosity of the inkjet recording ink of the present invention is preferably 30 mN/m or less. The viscosity is more preferably adjusted to 20 mN/m or less.

Examples of the surfactants include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and Research Disclosure, No. 308119 (1989) can also be used.

A defoaming agent such as fluorine- or silicone-base compound or chelating agent as represented by EDTA may be also used, if desired.

The aqueous medium mainly comprises water and if desired, a mixture where a water-miscible organic solvent is added can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the inkjet recording ink of the present invention, the azo dye represented by formula (1) is preferably contained in an amount of 0.2 to 30 parts by mass per 100 parts by mass of the inkjet recording ink. Also, in the inkjet recording ink of the present invention, other coloring agent may be used in combination with the azo dye. In the case of using two or more coloring agents in combination, the total content of coloring agents is preferably in the above-described range.

The inkjet recording ink of the present invention can be used not only for the formation of a monochromatic image but also for the formation of a full color image. For forming a full color image, a magenta color ink, a cyan color ink and a yellow color ink can be used.

As for the yellow dye which can be applied, an arbitrary yellow dye can be used. Examples thereof include aryl- or heteryl-azo dyes having a phenol, a naphthol, an aniline, a heterocyclic ring such as pyrazolone and pyridone, an open chain-type active methylene compound or the like as the coupling component (hereinafter called a coupler component); azomethine dyes having an open chain-type active methylene compound or the like as the coupler component; methine dyes such as benzylidene dye and monomethine oxonol dye; and quinone-base dyes such as naphthoquinone dye and anthraquinone dye. Other examples of the dye species include quinophthalone dye, nitro.nitroso dye, acridine dye and acridinone dye.

As for the magenta dye which can be applied, an arbitrary magenta dye can be used. Examples thereof include aryl- or heteryl-azo dyes having a phenol, a naphthol, an aniline, a heterocyclic ring such as pyrazine, an open chain-type active methylene compound or the like as the coupling component (hereinafter called a coupler component); azomethine dyes having an open chain-type active methylene compound or the like as the coupler component; and anthrapyridone dyes.

As for the cyan dye which can be applied, an arbitrary cyan dye can be used. Examples thereof include aryl- or heteryl-azo dyes having a phenol, a naphthol, an aniline or the like as the coupler component; azomethine dyes having a phenol, a naphthol, a heterocyclic ring such as pyrrolotriazole, or the like as the coupler component; polymethine dyes such as cyanine dye, oxonol dye and merocyanine dye; carbonium dyes such as diphenylmethane dye, triphenylmethane dye and xanthene dye; phthalocyanine dyes; anthraquinone dyes; and indigo-thioindigo dyes.

These dyes each may be a dye which provides each color of yellow or cyan for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

[Inkjet Recording Method]

In the inkjet recording method of the present invention, an energy is provided to the above-described inkjet recording ink and thereby an image is formed on a known image-receiving material, namely, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

At the formation of an image, a polymer latex compound may be used in combination for the purpose of giving glossiness or water resistance or improving the weather resistance. The timing of imparting the latex compound to the image-receiving material may be before, after or simultaneous with the addition of the coloring agent. Accordingly, the site to which the polymer latex is added may be in the image-receiving paper or ink or a liquid material of polymer latex alone may be prepared and used. More specifically, the methods described in JP-A-2002-166638, JP-A-2002-121440, JP-A-2002-154201, JP-A-2002-144696, JP-A-2002-80579, JP-A-2002-187342 and JP-A-2002-172774 can be preferably used.

The recording paper and recording film which are used in performing the inkjet printing by using an ink of the present invention are described below.

The support which can be used for the recording paper or film is produced, for example, from a chemical pulp such as LBKP and NBKP, a mechanical pulp such as GP, PGW, RMP, TMP, CTMP, CMP and CGP, a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film may be used. The thickness of the support is preferably from 10 to 250 μm and the basis weight is preferably from 10 to 250 g/m$^2$. An ink-receiving layer and a backcoat layer may be provided on the support as it is or after providing a size press or anchor coat layer by using starch, polyvinyl alcohol or the like, an ink-receiving layer and a backcoat layer may be provided. The support may be further subjected to a flattening treatment by a calendering device such as machine calender, TG calender and soft calender. The support for use in the present invention is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The ink-receiving layer provided on the support contains a pigment and an aqueous binder. The pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. The white pigment contained in the ink-receiving layer is preferably a porous inorganic pigment, more preferably a synthetic amorphous silica or the like having a large pore area. The synthetic amorphous silica may be either a silicic acid anhydride obtained by a dry production method or a silicic acid hydrate obtained by a wet production method but is preferably a silicic acid hydrate.

Examples of the aqueous binder contained in the ink-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene-butadiene latex and acryl emulsion. These aqueous binders can be used individually or in combination of two or more thereof. Among these, polyvinyl alcohol and silanol-modified polyvinyl alcohol are preferred in the present invention in view of attaching property to the pigment and peeling resistance of the ink-receiving layer.

The ink-receiving layer may contain a mordant, a water-proofing agent, a light fastness enhancer, a surfactant and other additives in addition to the pigment and the aqueous binder.

The mordant added to the ink-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for forming a water-resistant image. The water-proofing agent is preferably a cationic resin. Examples of the cationic resin include polyamidopolyamine epichlorohydrin, polyethyleneimine, polyaminesulfone, poly-dimethyldiallyl-ammonium chloride, cation polyacrylamide and colloidal silica. Among these cationic resins, polyamidopolyamine epichlorohydrin is preferred. The cationic resin content is preferably from 1 to 15 mass %, more preferably from 3 to 10 mass %, based on the entire solid content of the ink-receiving layer.

Examples of the light fastness enhancer include zinc sulfate, zinc oxide, hindered amine-base antioxidants and benzotriazole-base ultraviolet absorbents such as benzophenone. Among these, zinc sulfate is preferred.

The surfactant functions as a coating aid, a releasability improver, a slipperiness improver or an antistatic agent. The surfactant is described in JP-A-62-173463 and JP-A-62-183457. In place of the surfactant, an organofluoro compound may be used. The organofluoro compound is preferably hydrophobic. Examples of the organofluoro compound include a fluorine-containing surfactant, an oily fluorine-base compound (for example, fluorine oil) and a solid fluorine compound resin (for example, ethylene tetrafluoride resin). The organofluoro compound is described in JP-B-57-9053 (columns 8 to 17), JP-A-61-20994 and JP-A-62-135826. Other examples of the additive added to the ink-receiving layer include a pigment dispersant, a thickener, a defoaming agent, a dyestuff, a fluorescent brightening agent, an antiseptic, a pH adjusting agent, a matting agent and a hardening agent. The ink-receiving layer may be composed of either one layer or two layers.

In the recording paper or film, a backcoat layer may also be provided. The components which can be added to this layer include a white pigment, an aqueous binder and other components. Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dyestuff, a fluorescent brightening agent, an antiseptic and a water-proofing agent.

A polymer latex may be added to a constituent layer (including the backcoat layer) of the inkjet recording paper or film. The polymer latex is used for the purpose of improving film properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The ink of the present invention is not limited in the inkjet recording system and is used for a known system, for example, a charge controlling system of jetting out the ink by using an electrostatic induction force, a drop-on-demand system (pressure pulse system) of using a vibration pressure of a piezoelectric element, an acoustic ink-jet system of converting electric signals into acoustic beams, irradiating the beams on the ink and jetting out the ink by using the radiation pressure, and a thermal inkjet system of heating the ink to form a bubble and utilizing the pressure generated. The inkjet recording system includes a system of ejecting a large number of small-volume ink droplets of a so-called photo-ink having a low concentration, a system of improving the image quality by using a plurality of inks having substantially the same color hue but differing in the concentration, and a system of using a colorless transparent ink.

EXAMPLES

The present invention is described in greater detail below by referring to Examples, but the present invention is not limited to these Examples.

Example 1

Deionized water was added to the following components to make 1 liter and the resulting solution was stirred for 1 hour under heat at 30 to 40° C. Thereafter, the solution was adjusted to a pH of 9 with 10 mol/liter of KOH and then filtered under reduced pressure through a microfilter having an average pore size of 0.25 μm to prepare Ink Solution 101.

| Composition of Ink Solution 101: | |
| --- | --- |
| Dye (D-1) of the present invention | 25 g |
| Diethylene glycol | 20 g |
| Glycerin | 120 g |
| Diethylene glycol monobutyl ether | 230 g |
| 2-Pyrrolidone | 80 g |
| Triethanolamine | 17.9 g |
| Benzotriazole | 0.06 g |
| SURFYNOL TG | 8.5 g |
| PROXEL XL2 | 1.8 g |

Ink Solutions 102 to 104 were produced in the same manner as Ink Solution 101 except for changing the dye as shown in Table 7 below. In changing the dye, the dye used was added in an amount equimolar to that in Ink Solution 101.

(Evaluation of Solution Stability and Image Recording)

An inkjet recording ink comprising each of Ink Solutions 101 to 104 was subjected to the following evaluations. The results obtained are shown in Table 7.

In Table 7, the "ink Stability", "paper dependency", "water resistance", "light fastness", "Dark Heat Preservability" and "ozone gas resistance" were evaluated by the following methods after an image was recorded on photo gloss paper (PM Photographic Paper "KOTAKU" (KA420PSK, EPSON), produced by Seiko Epson Corp.) by using each ink-jet recording ink in an inkjet printer (PM-700C, manufactured by Seiko Epson Corp.).

<Ink Stability>

After aging of the ink solution at 70° C. for 2 days, the dye residual ratio was measured from the change in absorbance. The samples were rated on a three-stage scale, namely, rated A when the dye residual ratio was more than 90%, rated B when the dye residual ratio was from 70 to 90%, and rated C when the dye residual ratio was less than 70%.

<Paper Dependency>

The color tone of the image formed on the photo gloss paper was compared with that of an image separately formed on plain paper for PPC. The samples were rated on a two-stage scale, namely, rated A (good) when the difference between two images was small, and rated B (bad) when the difference between two images was large.

<Water Resistance>

The photo gloss paper having formed thereon an image was dried at room temperature for 1 hour, dipped in deionized water for 10 seconds and then naturally dried at room temperature. The bleeding was observed and the samples were rated on a three-stage scale, namely, rated A when bleeding was not generated, rated B when bleeding was slightly generated, and rated C when bleeding was seriously generated.

<Light Fastness>

On the photo gloss paper having formed thereon an image, xenon light (85,000 1x) was irradiated for 7 days by using a weather meter (Atlas C. I65). The image density before and after the xenon irradiation was measured by a reflection densitometer (X-Rite 310TR) and evaluated in terms of the dye residual ratio. The reflection density was measured at three points of 1, 1.5 and 2.0. The samples were rated on a three-stage scale, that is, rated A when the dye residual ratio was 70% or more at any density, rated B when less than 70% at one or two point(s), and rated C when less than 70% at all densities.

<Dark Heat Preservability>

The photo gloss paper having formed thereon an image was stored for 7 days under the conditions of 80° C. and 15% RH. The image density before and after the storage was measured by a reflection densitometer (X-Rite 310TR) and evaluated in terms of the dye residual ratio. The dye residual percentage was evaluated at three points having a reflection density of 1, 1.5 and 2.0. The samples were rated on a three-stage scale, that is, rated A when the dye residual ratio was 90% or more at any density, rated B when less than 90% at one or two point(s), and rated C when less than 90% at all densities.

<Ozone Gas Resistance>

The photo gloss paper having formed thereon an image was left standing for 4 days in a box set to an ozone gas concentration of 5 ppm, room temperature and dark place. The image density before and after standing in the ozone gas atmosphere was measured by a reflection densitometer (X-Rite 310TR) and evaluated in terms of the dye residual ratio. The reflection density was measured at three points of 1, 1.5 and 2.0. The ozone gas concentration in the box was set by using an ozone gas monitor (Model OZG-EM-01) manufactured by APPLICS. The samples were rated on a three-stage scale, namely, rated A when the dye residual ratio was 80% or more at any density, rated B when less than 80% at one or two point(s), and rated C when less than 80% at all densities.

TABLE 7

| Ink | Dye | Ink Storage Stability | Paper Dependency | Water Resistance | Light Fastness | Dark Heat Preservability | Ozone Resistance |
| --- | --- | --- | --- | --- | --- | --- | --- |
| 101 | D-1 | A | A | A | A | A | A |
| 102 | D-5 | A | A | A | A | A | A |
| 103 | Comparative Dye 1 | B | A | A | B | A | C |
| 104 | Comparative Dye 2 | C | A | A | C | B | C |

Comparative Dye 1:

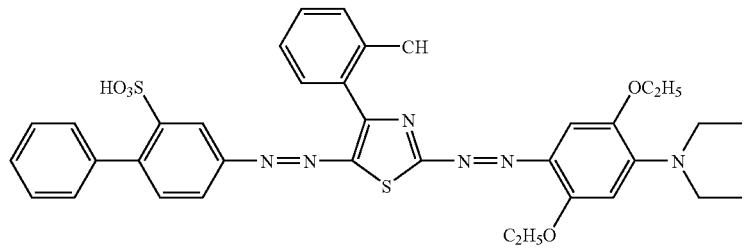

TABLE 7-continued

| Ink | Dye | Ink Storage Stability | Paper Dependency | Water Resistance | Light Fastness | Dark Heat Preservability | Ozone Resistance |
| --- | --- | --- | --- | --- | --- | --- | --- |

Comparative Dye 2:

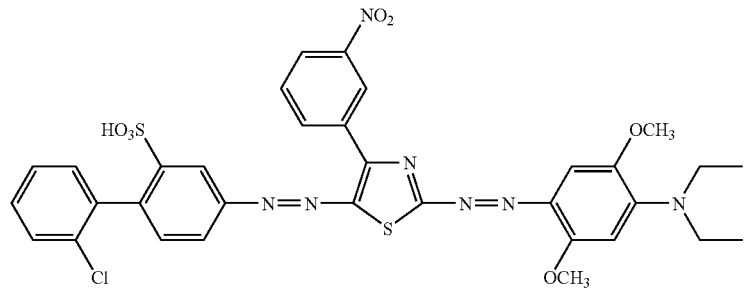

These are compounds described in Examples of JP-A-52-76331.

As seen in Table 7, Ink Solutions 101 and 102 of the present invention were excellent in the ink storage stability and the images obtained were excellent in the light fastness and ozone gas resistance as compared with those obtained by using comparative inks.

An image was recorded on superfine special gloss paper (MJA4S3P, produced by Seiko Epson Corp.) by using each of Ink Solutions 101 and 102 in an inkjet printer (PM-700C, manufactured by Seiko Epson Corp.). The color hue and light fastness of each image obtained were evaluated, as a result, the same results as in Table 7 were obtained in either case.

Example 2

By using the same inks as produced in Example 1, an image was printed on inkjet paper Photo-Gloss Paper EX produced by Fuji Photo Film Co., Ltd. in the same printer as used in Example 1 and subjected to the same evaluations as in Example 1. Then, the same results as in Example 1 were obtained.

Example 3

The same inks as produced in Example 1 each was filled in the cartridge of an inkjet printer BJ-F850 (manufactured by Canon Inc.) and an image was printed on photo gloss paper GP-301 produced by the same company in that printer and subjected to the same evaluations as in Example 1. Then, the same results as in Example 1 were obtained.

This application is based on Japanese Patent application JP 2003-331807, filed Sep. 24, 2003, the entire content of which is hereby incorporated by reference, the same as if set forth at length.

What is claimed is:

1. An aqueous ink comprising at least one dye having at least one ionic hydrophilic group within a molecule thereof and represented by the following formula (1):

Formula (1):

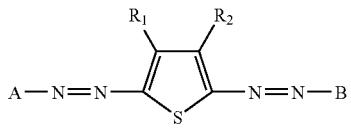

wherein

A and B each independently represents a substituted or unsubstituted monovalent aromatic group or a substituted or unsubstituted monovalent heterocyclic group, $R_1$ represents a substituted or unsubstituted aromatic group excluding an unsubstituted phenyl group, or $R_1$ represents a substituted or unsubstituted heterocyclic group, and $R_2$ represents a substituent.

2. The aqueous ink according to claim 1, wherein in the formula (1), B represents a substituted or unsubstituted heterocyclic group.

3. The aqueous ink according to claim 1, wherein in the formula (1), $R_1$ represents a substituted phenyl group, a substituted or unsubstituted naphthyl group or a substituted or unsubstituted heterocyclic group.

4. The aqueous ink according to claim 1, wherein the dye represented by the formula (1) is a dye represented by the following formula (2):

Formula (2):

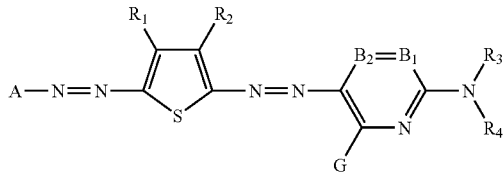

wherein

A represents a substituted or unsubstituted monovalent aromatic group or a substituted or unsubstituted monovalent heterocyclic group;

$R_1$ represents a substituted or unsubstituted aromatic group excluding an unsubstituted phenyl group, or $R_1$ represents a substituted or unsubstituted heterocyclic group;

$R_2$ represents a substituent;

$B_1$ and $B_2$ each represents =$CR_5$— or —$CR_6$= or either one of $B_1$ and $B_2$ represents a nitrogen atom and other represents =$CR_5$— or —$CR_6$=;

G, $R_5$ and $R_6$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an anilino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted;

$R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may be further substituted, provided that $R_3$ and $R_4$ are not a hydrogen atom at a same time; and $R_3$ and $R_5$, or $R_3$ and $R_4$ may combine to form a 5- or 6-membered ring.

5. The aqueous ink according to claim 4, wherein the dye represented by the formula (2) is a dye represented by the following formula (3):

Formula (3):

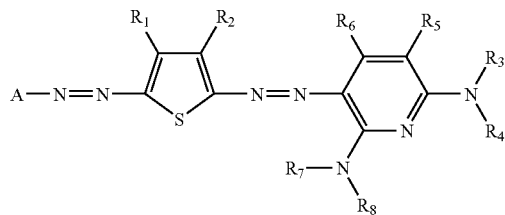

wherein

A represents a substituted or unsubstituted monovalent aromatic group or a substituted or unsubstituted monovalent heterocyclic group;

$R_1$ represents a substituted or unsubstituted aromatic group excluding an unsubstituted phenyl group, or $R_1$ represents a substituted or unsubstituted heterocyclic group;

$R_2$ represents a substituent;

$R_5$ and $R_6$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an anilino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted; and $R_3$, $R_4$, $R_7$ and $R_8$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may be further substituted, provided that $R_3$ and $R_4$ are not a hydrogen atom at a same time; $R_7$ and $R_8$ are not a hydrogen atom at a same time; and $R_3$ and $R_5$, $R_3$ and $R_4$ or $R_7$ and $R_8$ may combine to form a 5- or 6-membered ring.

6. The aqueous ink according to claim 1, wherein in the formula (1), $R_2$ represents an electron-withdrawing group.

7. The aqueous ink according to claim 1, wherein in the formula (1), $R_2$ represents a cyano group, a nitro group, a halogen atom, a sulfone group, a trifluoromethyl group, a carbamoyl group, an alkoxycarbonyl group an alkylsulfonyl group or an arylsulfonyl group.

8. An inkjet recording ink comprising the aqueous ink according to claim 1.

* * * * *